US011610021B2

(12) United States Patent
Beloussov et al.

(10) Patent No.: US 11,610,021 B2
(45) Date of Patent: Mar. 21, 2023

(54) SYSTEM AND METHOD FOR MASKING USER IDENTITY IN DIGITAL INTERACTIONS

(71) Applicant: Acronis International GmbH, Schaffhausen (CH)

(72) Inventors: Serguei Beloussov, Costa del Sol (SG); Oleg Melnikov, Moscow (RU); Alexander Tormasov, Moscow (RU); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 1 day.

(21) Appl. No.: 17/488,442

(22) Filed: Sep. 29, 2021

(65) Prior Publication Data

US 2022/0019691 A1  Jan. 20, 2022

Related U.S. Application Data

(63) Continuation of application No. 16/571,661, filed on Sep. 16, 2019, now Pat. No. 11,210,419.

(60) Provisional application No. 62/734,302, filed on Sep. 21, 2018.

(51) Int. Cl.
*G06F 21/62* (2013.01)
*G06N 20/00* (2019.01)
*G06F 9/451* (2018.01)

(52) U.S. Cl.
CPC .......... *G06F 21/6245* (2013.01); *G06F 9/451* (2018.02); *G06N 20/00* (2019.01)

(58) Field of Classification Search
CPC ................ G06F 21/6245; G06F 9/451; G06F 2221/2149; G06N 20/00; G06Q 10/10; G06Q 30/0241; G06Q 30/0251
See application file for complete search history.

*Primary Examiner* — Pei Yong Weng
(74) *Attorney, Agent, or Firm* — ArentFox Schiff LLP; Michael Fainberg

(57) ABSTRACT

Disclosed herein are systems and methods for protecting user data. In one aspect, an exemplary method comprises, by a hardware processor, detecting one or more user files modified by a user on a user device; identifying user actions executed by the user to modify the one or more user files; training a machine learning algorithm to identify whether an arbitrary user action is performed by the user, wherein the user actions used by the user to modify the one or more user files are comprised in a training dataset of the machine learning algorithm; detecting a user action to modify a user file; determining, using the machine learning algorithm, whether the user action classifies as being performed by the user; and in response to determining that the machine learning algorithm classifies the user action as being performed by the user, modifying the user action to mask an identity of the user.

19 Claims, 4 Drawing Sheets

SYSTEM AND METHOD FOR MASKING USER IDENTITY IN DIGITAL INTERACTIONS

CROSS-REFERENCE TO RELATED APPLICATIONS

This application is a continuation of prior U.S. patent application Ser. No. 16/571,661, filed Sep. 16, 2019, which claims benefit of priority to provisional U.S. Patent Application No. 62/734,302, filed on Sep. 21, 2018, which is incorporated herein by reference, and claims benefit of priority under 35 U.S.C. 120 to application Ser. No. 16/173, 405 which is related to prior U.S. patent application Ser. No. 15/260,558, filed Sep. 9, 2016 and U.S. patent application Ser. No. 15/469,647, filed Mar. 27, 2017.

FIELD OF TECHNOLOGY

The present disclosure relates generally to the field of information management, more specifically, to systems and methods of controlling personal and private user information.

BACKGROUND

As the popularity of computing devices and mobile computing devices (e.g., smartphones) increases and the applications for these devices continue to develop with diversified functions, more and more users are using these devices for the purposes of connecting to the Internet, taking pictures, listening to music, watching movies, sharing information, and the like. Although these computing devices improve the convenience of our life, the data stored in the devices becomes increasingly large, and there are significant issues such as the privacy of a user and the confidentiality of data. Moreover, users often need to complete tens, hundreds or even thousands of online actions (e.g., online payments, social media posts, and the like) each month.

When a user works with a computer or a mobile device and performs online actions, the user constantly modifies or creates different files and objects (e.g., some local, some remote, etc.) by writing messages, posting forum/blog entries, taking pictures, loading pictures from other sources, and the like. Due to the vast amounts of user data being created each day, it is increasingly difficult for computer users to be vigilant at all times, and may sometimes accidentally share pieces of private information. Even if just small pieces of private information are shared or leaked out, it is possible for a malicious actor to collect and reconstruct an individual's private data, which may then lead to increased exposure and vulnerability.

As such, there is a need for an improvement in protecting user data—thereby providing privacy to the user.

SUMMARY

Aspects of the present disclosure relate to protecting user data, more specifically to systems and methods for monitoring a computing device to detect instances of private user data and controlling transmissions and interactions with such private user data.

In one exemplary aspect, a method for protecting user data is implemented in a computer comprising a hardware processor, the method comprising: by the hardware processor, detecting one or more user files created by a first user and stored on a user device, the one or more user files containing personal information associated with the first user, generating user transactional data associated with one or more detected network-based interactions, by the first user, with a service provider, generating user behavior data based on one or more user interactions, by the first user, with a graphical user interface of the user device, applying a machine learning model to user data to generate a classification of the first user, wherein the user data comprises the user files, the user transactional data, and the user behavior data, and when the user is identifiable based on the generated classification, modifying at least one of (i) user files stored on the user device and (ii) user behavior of the first user during an operation of the user device.

According to one aspect of the disclosure, a system is provided for protecting user data, the system comprising a hardware processor configured to: detect one or more user files created by a first user and stored on a user device, the one or more user files containing personal information associated with the first user, generate user transactional data associated with one or more detected network-based interactions, by the first user, with a service provider, generate user behavior data based on one or more user interactions, by the first user, with a graphical user interface of the user device, apply a machine learning model to user data to generate a classification of the first user, wherein the user data comprises the user files, the user transactional data, and the user behavior data, and when the user is identifiable based on the generated classification, modify at least one of (i) user files stored on the user device and (ii) user behavior of the first user during an operation of the user device.

In one exemplary aspect, a non-transitory computer-readable medium is provided storing a set of instructions thereon for protecting user data, wherein the set of instructions comprises instructions for: detecting one or more user files created by a first user and stored on a user device, the one or more user files containing personal information associated with the first user, generating user transactional data associated with one or more detected network-based interactions, by the first user, with a service provider, generating user behavior data based on one or more user interactions, by the first user, with a graphical user interface of the user device, applying a machine learning model to user data to generate a classification of the first user, wherein the user data comprises the user files, the user transactional data, and the user behavior data, and when the user is identifiable based on the generated classification, modifying at least one of (i) user files stored on the user device and (ii) user behavior of the first user during an operation of the user device.

In one aspect, the method further comprises modifying of at least one of the detected one or more user files based on a determination that the first user is transmitting the at least one of the detected one or more user files to an external resource.

In one aspect, the method further comprises receiving, from a public monitor, an indication that personal information associated with the first user is publicly available on a third-party service, where the user data to which the machine learning model is applied is further comprised of the received indication.

In one aspect, the machine learning model is trained based on the collected user data to simulate an advertising behavioral targeting the first user.

In one aspect, the method further comprises determining, based on the machine learning model, a likelihood that the user behavior data is uniquely identifiable of the user by a third party, and modifying the behavior of the first user to anonymize the first user's operation of the user device based on the determined likelihood.

In one aspect, the modifying of the behavior further comprises: inserting random user input events associated with an input device of the user device, where the user input events include at least one of: mouse cursor movements and keyboard shortcuts.

In one aspect, the modifying of the behavior further comprises: modifying a graphical user interface settings associated with a windowed graphical user interface of the user device.

The protection of user data in accordance with the teachings of the present disclosure improves privacy of the user while the user is able to access services, e.g., from social networks. The improvement in achieved by: detecting one or more user files created by a first user and stored on a user device, the one or more user files containing personal information associated with the first user, generating user transactional data associated with one or more detected network-based interactions, by the first user, with a service provider, generating user behavior data based on one or more user interactions, by the first user, with a graphical user interface of the user device, applying a machine learning model to user data to generate a classification of the first user, wherein the user data comprises the user files, the user transactional data, and the user behavior data, and when the user is identifiable based on the generated classification, modifying at least one of (i) user files stored on the user device and (ii) user behavior of the first user during an operation of the user device.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for monitoring and protecting private user data. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Due to the vast amounts of user data being created each day, it is increasingly difficult for computer users to be vigilant at all times, and may sometimes accidentally share pieces of private information. Even if just small pieces of private information are shared or leaked out, it is possible for a malicious actor to collect and reconstruct an individual's private data, which may then lead to increased exposure and vulnerability. Examples of such user data may include "artifacts" (e.g., documents, pictures, electronic tables, notes), transactional user data (e.g., website visits, cached pages, cached images, browser cookies, search engine queries, browser bookmarks), and user behavioral data (e.g., how fast does a user read through a 1-scroll webpage, a 2 scroll-webpage, how does a user move their mouse cursor across the webpage before clicking on a menu item, how quickly does a user fill out a form, etc.). Based on this data, it is possible to not only create a profile, but also create a digital avatar (as described in greater detail below), and later identify the user and/or data. Further based on this data, it is possible for third parties to perform behavioral targeting for advertisements to publish more relevant advertisements and offers for goods/services.

According to aspects of the present disclosure, a technique is provided that analyzes the above-mentioned types of user data (i.e., artifacts, transactional user data, user behavioral data) about a given user, and then provides a recommendation for protecting the user in an improved manner and/or to change certain user habits or behaviors. Aspects of the disclosure may utilize one or more machine learning models to: classify a given user, determine how easily the given user can be recognized based on the user data, and identify how the "digital life" of the user's data can be used by third parties, e.g., by social networking services, search engines, online advertising companies, etc.

Figure 1:
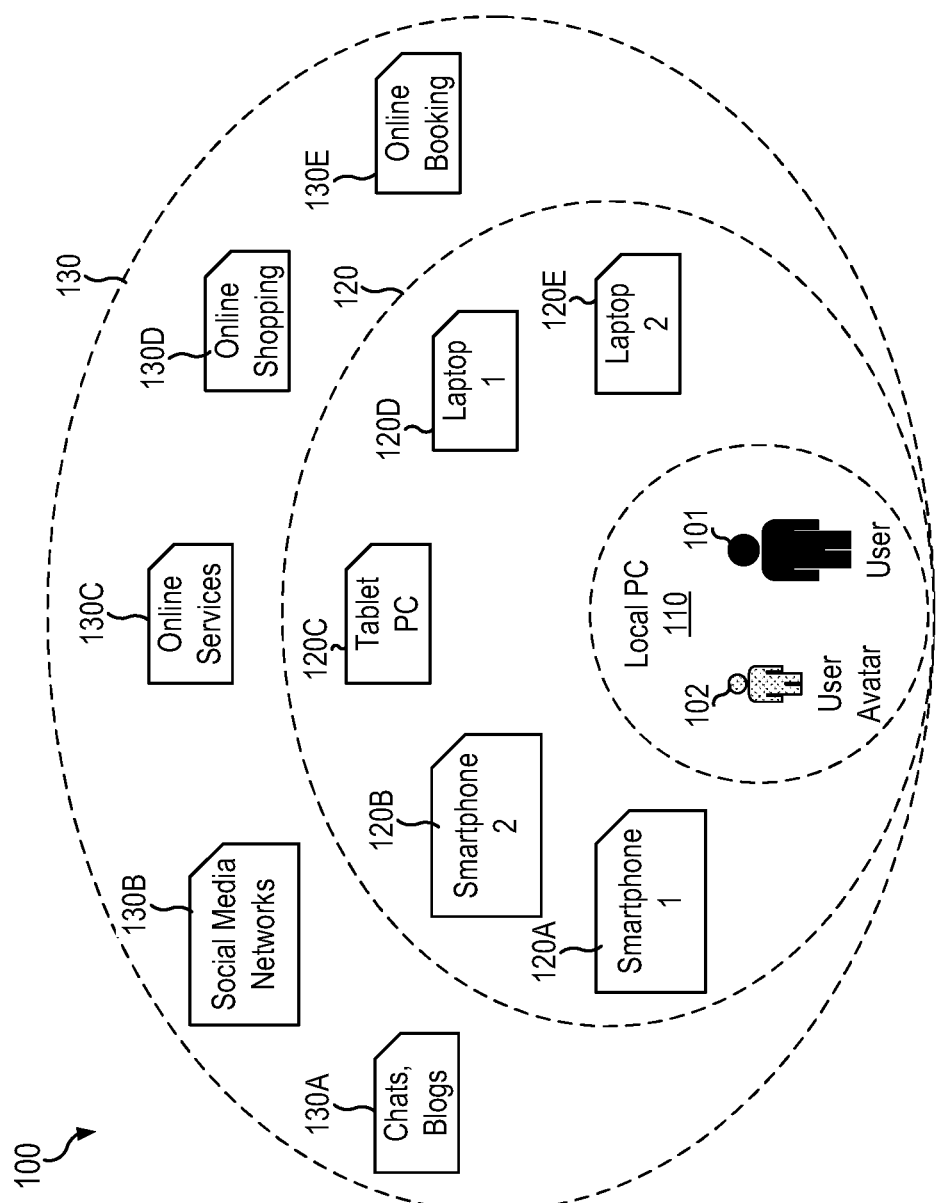
FIG. 1 illustrates a block diagram of a general infrastructure for a storage of personalized user data and control of private user in accordance with aspects of the present disclosure.

FIG. 1 illustrates a block diagram of a general infrastructure for the storage of personalized user data and control of private user data according to an exemplary aspect. In general, the disclosed system utilizes a local personal computer ("PC") 110 of the user 101 that implements one or more personalized data protection applications that are configured to log some (preferably all) user actions performed with the user's electronic computer files as well as user actions performed with network-based resources (e.g., websites). In some aspects, the modified user files are backed-up for data recovery purposes and optionally used to train a personalized avatar 102 to perform automated user actions. In one aspect of the present disclosure, the modified user files and other user data are analyzed using machine learning models to generate recommendations for the user 101 related to the protection of the user's data and/or modification of the user's behavior/habits so as to decrease vulnerabilities due to unsolicited offers and intrusions (e.g., spam, malware), as described in detail below.

According to the exemplary aspect, all (or most) of the "artifacts" (i.e., files) modified by the user actions are detected. Examples of such artifacts modified by user actions may include actions such as sending messages, uploading images or videos, taking pictures/videos, posting on social networks or in chats, forums or blogs, and the like. In one aspect, these files can be located on the user's mobile device(s) or computer system(s), for example. Moreover, the files can be modified by user actions indirectly. As will be discussed in greater detail below, the detected modified files are written into storage fully or incrementally. The writing of the modified files into the storage can be performed dynamically (i.e., after each user action) or periodically.

As further shown, the local PC 110 is configured to manage the data of a plurality of user devices, including the PC 110 itself, as well as a plurality of secondary devices (i.e., "personal" devices 120A-120E). For example, the user 101 can have a first smartphone 120A, a second smartphone 120B, a tablet PC 120C, a first laptop 120D and a second laptop 120E. Of course it should be appreciated that these five personal devices are shown in FIG. 1 only for illustrative purposes.

Moreover, it should be understood that the user 101 can use the local PC 110 and/or one or more of the secondary personal devices 120A-120E to contact and/or interact with third party services 130A-130E (i.e., "external resources"), such as the Internet, websites, app-based services, and the like. Thus, according to an exemplary aspect, user activity in blogs 130A and social networks 130B is detected in order to determine which user files on the various devices have been modified. Moreover, the system can monitor activity on certain online services 130C, including online shopping systems 130D and/or online banking systems 130E, as well as other services such online gaming systems.

In some aspects, user actions, for example, on sites of social network 130B can be intercepted and the associated data (e.g., messages, discussion threads, images, videos etc.) can be stored and copied for analysis. In one aspect, all user modifications can be detected by crawlers or search bots that can detect all modifications made by a user in a certain volume or directory, for example. For example, files and directories may be checked for uniqueness and added to the backup when changes are detected. In one aspect, when several modifications have been made by the user, the entire history of the file(s) is stored. In a further refinement of this aspect, the system is configured to store only user-modified data, as opposed to storing all data of a web page accessed by the user (i.e., for example, together with some website identifying data).

In some aspects, user transactional data may be generated based on detected network-based interactions by the user 101 with external resources 130, such as a service provider, a website, or a server-based system. The user transactional data may include files, configuration files, and data stored locally on the computing device 110. User transactional data associated with the user's usage of a web browser application to interact with a website or other web-based system may include such files as a history log file of website visits, cached webpages, cached images, other cached resources, browser cookies, search engine queries, and browser bookmarks. In one aspects, a periodic scan of third-party services 130A-130E may detect that some amount of personal information of the user 101 is publically accessible on a third-party resource, such as a website or a social networking service. In one aspect, the periodic scan may further detect that a user transactional data may be generated, wherein the generated user transaction data provides an indication of the personal information of the user that is publicly accessible on one or more third-party resources.

In one aspect, user behavior data may be generated based on one or more user interactions, by the user 101, with a graphical user interface of the computing device 110. Such user behavioral data provides information that can be analyzed to determine a user's particular habits or behaviors that might be uniquely identifiable, e.g., uniquely identifying the user 101. For example, the user behavior data may specify a duration of time used by the user 101 to read through a particular webpage having a particular length (e.g., 1-scroll webpage, 2-scroll webpage). In another example, the user behavior data may specify the user's behavior related to a mouse or other input device, including average speeds, acceleration, and pathing, in certain scenarios (e.g., how does the user 101 move their mouse across a page before clicking on a menu item). In yet another example, the user behavior data may specify a duration of time spent, by the user 101, to fill out a particular form, or a form on average. It is understood that a variety of other behavioral parameters may be used. In some aspects, the user behavior data may be aggregated and processed into statistical information, while in other aspects, the user behavior data may be maintained in a raw format.

It should be appreciated that certain user data can be affected by user actions indirectly. For example, if a user posts some comment to an already existing post or several posts, the system can identify the original (i.e., initial post and possibly some other parts) and the initial post can be included into the analysis, for example. Moreover, according to one aspect, all application files on the computer system (e.g., local PC 110) or mobile device (e.g., smartphone 120B) affected by user interaction with the computer or device are detected and accumulated in one or more storage devices. In one aspect, some (and preferably all) of these files are identified (i.e., detected) by the detection algorithm, including using heuristic and other detection rules.

Moreover, as will be described in more detail below, the detected modified files and user data can be written into a storage device, such as a cloud storage service. Then, the user data and files modified by the user across different devices can be used to train a personal user "behavior avatar" 102 that represents the user's typical behavior. In this aspect, the avatar 102 on local PC 110 may be implemented as one or more machine learning (ML) models that are configured to, based on a given input (user data), classify the user 101 or indicate whether the input is representative or identifiable to the user 101. It is understood that certain third-party services 130 (e.g., digital advertising platforms, ad trackers, ad-based services) might be building similar user profiles of the user 101 and other users, using personal or private data inadvertently leaked by the user 101, which can be used to perform behavioral targeting for advertisements or even malicious behavior. However, unlike in the third-party services, the avatar 102 can be used as a simulated privacy adversary for analyzing user data (e.g., user transactional data, user behavior data) and for recommending ways to protect the user's privacy. For example, the avatar 102 can be used to test whether detected user data makes the user recognizable to third-party services (e.g., ad trackers). In a further example, the user avatar 102 can be used to test whether a proposed modification to user transactional data or behavior data sufficiently masks the identity of the user 101. In a refinement of this aspect, the avatar 102 can also be trained within a cloud computing service. That is, instead of the avatar being generated and trained on the local PC 110, the modified data can be backed up on the cloud computing service, which includes a processor configured to train the avatar 102.

Figure 2:
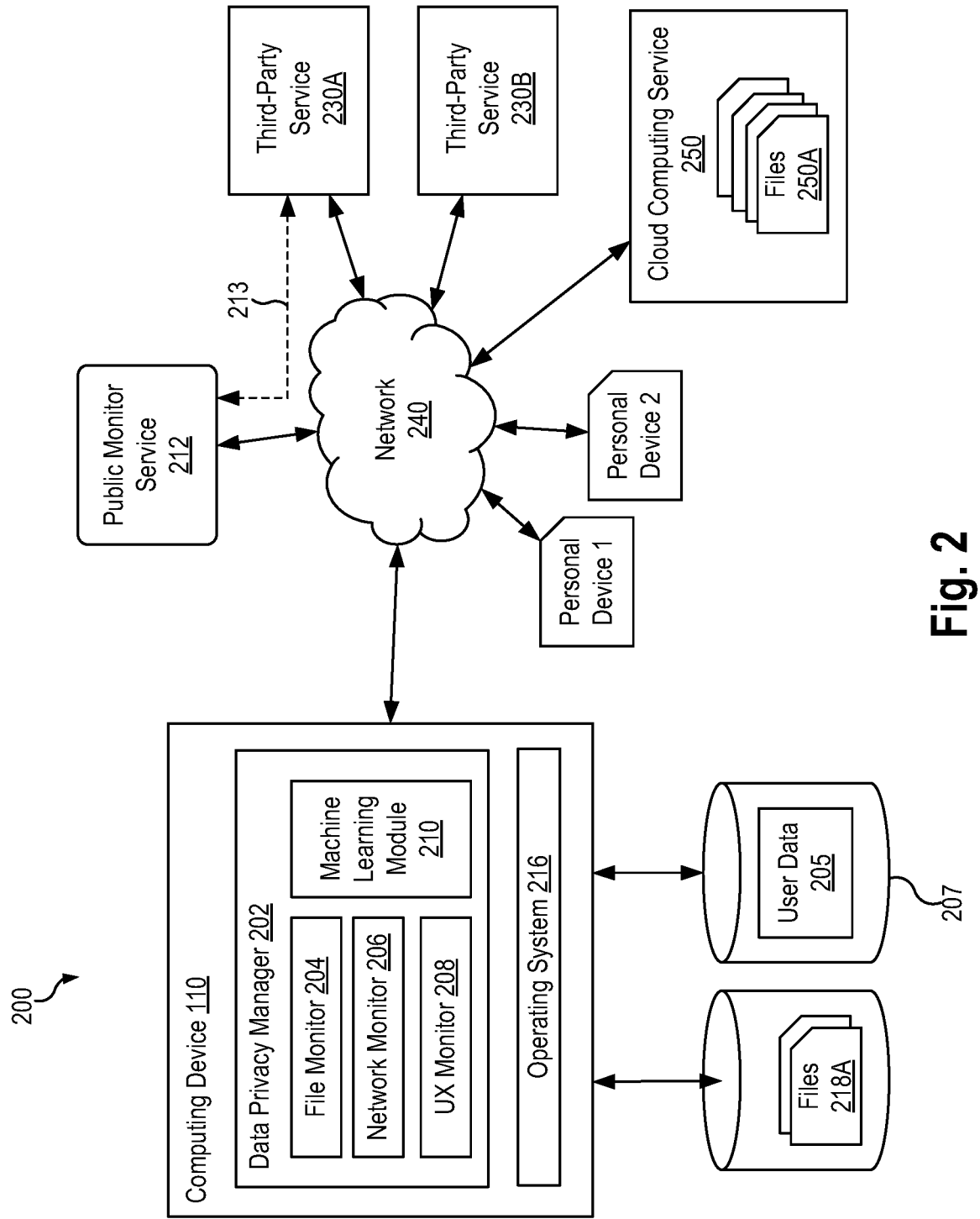
FIG. 2 illustrates a block diagram of a system for protecting and controlling user data based on user behavioral data in accordance with aspects of the present disclosure.

FIG. 2 illustrates a block diagram of a system 200 for protecting and controlling user data based on user behavioral data in accordance with aspects of the present disclosure. As shown, the system 200 generally includes a computing device 110, which may correspond to the local PC 110 shown in FIG. 1 and described above. Generally, the computing device 110 is configured to detect user actions and manage the storage of related user data and generate a personalized avatar 102 for the user 101, as described herein. Moreover, according to the exemplary aspect, the computing device 110 may be any type of computing device, such as a laptop, a desktop, a tablet, a mobile phone and the like. The specific hardware details of the exemplary computing device 110 will be described below with respect to FIG. 4.

As further shown, the system 200 includes a plurality of personal devices 220A and 220B (e.g., user gadgets, mobile devices, and the like). The personal devices 220A and 220B correspond to one or more of the secondary personal devices 120A-120E shown in FIG. 1 and described above. Moreover, the computing device 110 is configured to detect and identify each of the plurality of personal devices 220A and 220B using known public accounts of the user, such as Google®, Microsoft®, Apple® ID, and the like.

Furthermore, in one aspect, the personal devices 220A and 220B are configured to communicate with the computing device 110 over a network 240. The applicable network 240 can be any network for communicating data and data operations and can include a communication system (not shown) that connects the various components of the system 100 by wire, cable, fiber optic, and/or wireless links facilitated by various types of well-known network elements, such as hubs, switches, routers, and the like. It should be appreciated that the network may employ various well-known protocols to communicate information amongst the network resources. In one aspect, the network can be part of the Internet or intranet using various communications infrastructures such as Ethernet, WiFi, and the like.

In addition, a plurality of third-party services (i.e., third-party services 230A and 230B) are also communicatively coupled to the system 200 by network 240. According to the exemplary aspect, the third-party services 230A and 230B correspond to one or more of blogs 130A (i.e., forums, chat rooms and blog); social networks 130B (e.g., Facebook®, Twitter®, Instagram®, LinkedIn®, and the like); online services 130C, including online multimedia services (e.g., YouTube®, Flickr®, and the like) and online data storages (e.g., Dropbox®, OneDrive®, Google Drive®, and the like); online shopping system 130D; and/or online banking system 130E. According to the exemplary aspect, the computing device 110 is further configured to detect user activities across global networks relating to one of the third-party services 230A and 230B, as will be discussed in detail below. In yet another refinement of this aspect, the computer 100 can further detect user activities by monitoring MMS/SMS messages, for example.

The system 200 may further include a remote data storage device, such as a cloud computing service 250, which can include a data archive (i.e., cloud storage). It is contemplated that the cloud computing service 250 can include any type of remote file storage system, such as an online/remote file storage service or cloud computing service. Examples of such services include Amazon® Simple Storage Service ("S3"), and Microsoft® Azure ("Azure"). In general, companies such as Microsoft® and Amazon® (i.e., "storage service providers") set up networks and infrastructure to provide one or more multi-client services (such as various types of cloud-based storage) that are accessible via the Internet and/or other networks to a distributed set of clients in a company, organization or the like. These storage service providers can include numerous data centers that can be distributed across many geographical locations and that host various resource pools, such as collections of physical and/or virtualized storage devices, computer servers, networking equipment and the like, needed to implement, configure and distribute the infrastructure and services offered by the storage service provider.

Referring back to the computing device 110, the computing device 110 includes an operating system 216 and a central processing unit ("CPU") provided to, among other things, execute a data privacy manager 202. In one aspect, the data privacy manager 202 includes software code (e.g., processor executable instructions) in memory, which may be configured to execute/facilitate the storage, management, and protection of user data according to exemplary aspects of the present disclosure described herein.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein. For purposes of this disclosure below with respect to the exemplary algorithms, the disclosure generally refers to the computing device 110 and/or a CPU and/or one of the specific modules as shown to perform the various steps of the algorithm.

As further shown in FIG. 2, the computing device 110 includes one or more storage devices 207 that stores electronic data, for example, data files 218A and user data 205, which can be one or several types of personal data, such as user data including files, documents, pictures, videos, and the like. Moreover, according to an exemplary aspect, the storage device(s) 207 may include one or more mass storage devices which can include for example, flash memory, magnetic or optical disks, or tape drives; read-only memory (ROM); random-access memory (RAM); erasable programmable memory (e.g., EPROM and EEPROM); flash memory; or any other type of storage medium.

According to the exemplary aspect, the data privacy manager 202 is configured to detect and identify all information relating to a user of the computing device 110 and then analyze such user-related data to recommend (or automatically perform) user actions that improve the data protection and privacy of the user data. In one aspect, the data privacy manager 202 may include a file monitor 204, a network monitor 206, a user experience (UX) monitor 208, and a machine learning module 210. In some aspects, the data privacy manager 202 may determine, based on the machine learning module 210, a likelihood that the detected user data is uniquely identifiable of the user 101 by a third party service 230, and then modify the expressed behavior of the user 101 to anonymize or disguise the user's identity during their operation of the computing device 110.

In one aspect, the file monitor 204 may be configured to identify the user's activities and the user files (e.g., files 218A stored in a memory of the computing device 110) modified by these activities directly or indirectly. The file monitor 204 may be configured to scan such files 218A and flag any files upon the detection of the presence of any personal or private information contained in the files. For example, the file monitor 204 may scan a document file created by the user that contains private data or personally identifiable information. Personally identifiable information may include any data that may be used to distinguish the individual identity of the user 101. Examples of personally identifiable information may include a user's full legal name, a home address, an email address, a national identification number (e.g., Social Security number), passport number, license plate number, driver's license number, credit card numbers, date of birth of the user 101, telephone number and other contact information of the user, usernames and password credentials of the user. Other types of personal data may be detected, such as the age of the user, gender or race of the user, the location of residence, the occupation and salary of the user, etc. In one example, the file monitor 204 may scan an identified image file for the presence of file metadata that constitutes personal or private information related to the user, such as geographical coordinates (e.g., geotags) of where the image was taken, file author and owner names. In some aspects, the file monitor 204 may apply a machine vision algorithm to an identified image file to detect the presence of sensitive images, such as images of sensitive documents (such as a photograph of a driver's license) or images of the user's face.

Moreover, the file monitor 204 may be configured to detect the file(s) directly affected by the user interactions with the particular device, such as a PC, laptop, tablet or smartphone (i.e., the personal devices 220A and/or 220B). It should be appreciated that while the exemplary aspect is described with regard to detected changes in user files 218A on computing device 110 in response to certain detected user activities, that the modified files could be stored on one or more of the secondary personal devices (e.g., the personal devices 220A and/or 220B) according to an alternative aspect or in combination with the exemplary aspect. Moreover, in addition to the user files, the system can further be configured to store metadata relating to the user actions that resulted in the modified user files, including the time of the action, the type of the action, who performed the action, and the like. Thus, in this aspect, the metadata relating to user actions as to how the file was modified is stored together with the modified file.

In some aspects, the system 200 may include a public monitor service 212 that is configured to, as a background operation 213, check and monitor any user activities with the third-party services 230A and 230B (e.g., social networks, discussion forums) for the presence of private user data. In some aspects, the data privacy manager 202 may receive from the public monitor service 212 one or more notifications or indications that personal information of the user 101 is publicly available on a third-party service, such as a social networking service or a social media network.

Having this information, the data privacy manager 202 may be configured to suggest that the user 101 remove the identified personal or sensitive information from the documents and/or third-party services. In some aspects, the data privacy manager 202 may be configured to automatically act on behalf of the user and remove such private data. For example, the automatic action may be performed each time the user sends or uploads a document to an external resource 230 (e.g., sites, social networks, etc.)

In an aspect, the network monitor 206 of the data privacy manager 202 may be configured to generate user transactional data associated with one or more detected network-based interactions by the user with a third-party service provider. The network monitor 206 may alert a user that some sites or web pages might be tracking and collecting information about visitors (e.g., IP addresses, location, information about computer configurations which can fingerprint a user), and whether such particular sites are insecure (e.g., it is determined that they send or store passwords in plain text). In some aspects, the network monitor 206 may check such user transactional data against a reference database having information on flagged websites, which are predetermined to share personal information or sell such information to other parties. In response to detecting such network-based interactions with flagged third-party services, the network monitor 206 may raise an alert for any detected connections with such flagged web sites, services, or other external resources (or automatically deny/abort the detected connections to such external resources).

In one aspect, the network monitor 206 may monitor web connections and other network-based communications that the computing device 110 makes with other devices and/or third-party services 230. The network monitor 206 may configure the operating system 216 to facilitate the monitor of any web connections, such any applications executing on the computing device 110 (e.g., web browsers), using a variety of protocols (e.g., TCP, UDP, FTP, SMTP, POP, HTTPS, HTTP, NTP, SSH, etc.). The network monitor 206 (and optionally the public monitor service 212) may maintain and constantly update a database of public web services (social networking sites and other sites) in view of how dangerous such services can be in terms of leakage of personal information.

In one aspect, the user experience (UX) monitor 208 may be configured to generate user behavior data based on one or more detected user interactions by the user 101 with a graphical user interface of the computing device 110. The graphical user interface may be generated and rendered by the operating system 216 of the computing device 110. In some cases, the monitored graphical user interface may be the specific graphical window, control elements, and other user interface elements related to a particular application used by the user (e.g., a web browser application). It has been determined that certain patterns of user behavior can be used to identify users, even if they are anonymous.

In one aspect, the UX monitor 208 may act as a type of filter that, when enabled, changes the behavior patterns during a connection between the user 101 and a third-party services (e.g., web service, website). In other words, the UX monitor 208 provides the option to anonymize the user's behavior by making it distinguished from the user's usual behavior. The UX monitor 208 can track and record the user's behavior and habits including the user's personalization settings of the computing device 110, such as input behavior (e.g., mouse cursor movements), output configurations (e.g., some users prefer full-screen windows, others like to re-size their windows), a pattern of usage of certain keyboard combinations and shortcuts regards to the graphical user interface. In some aspects, the UX monitor 208 may be configured to modify the user behavior by injecting input events into the operating system 216 so as to change the behavior pattern of the user 101 from one that is identifiable (e.g., via the machine learning model) to one that appears anonymous or generic.

The machine learning module 210 may be configured to execute several scenarios, including the incorporation of one or more test users, which perform typical commonplace operations such as web browsing, using social networking services, and different commercial services (e.g., internet shops, banking, travel services, etc.). The machine learning module 210 may be configured to create an initial engine which can be scalable for any further user data and user activities, and can be easily extendible for new objects, events, and activities, etc.

Figure 3:
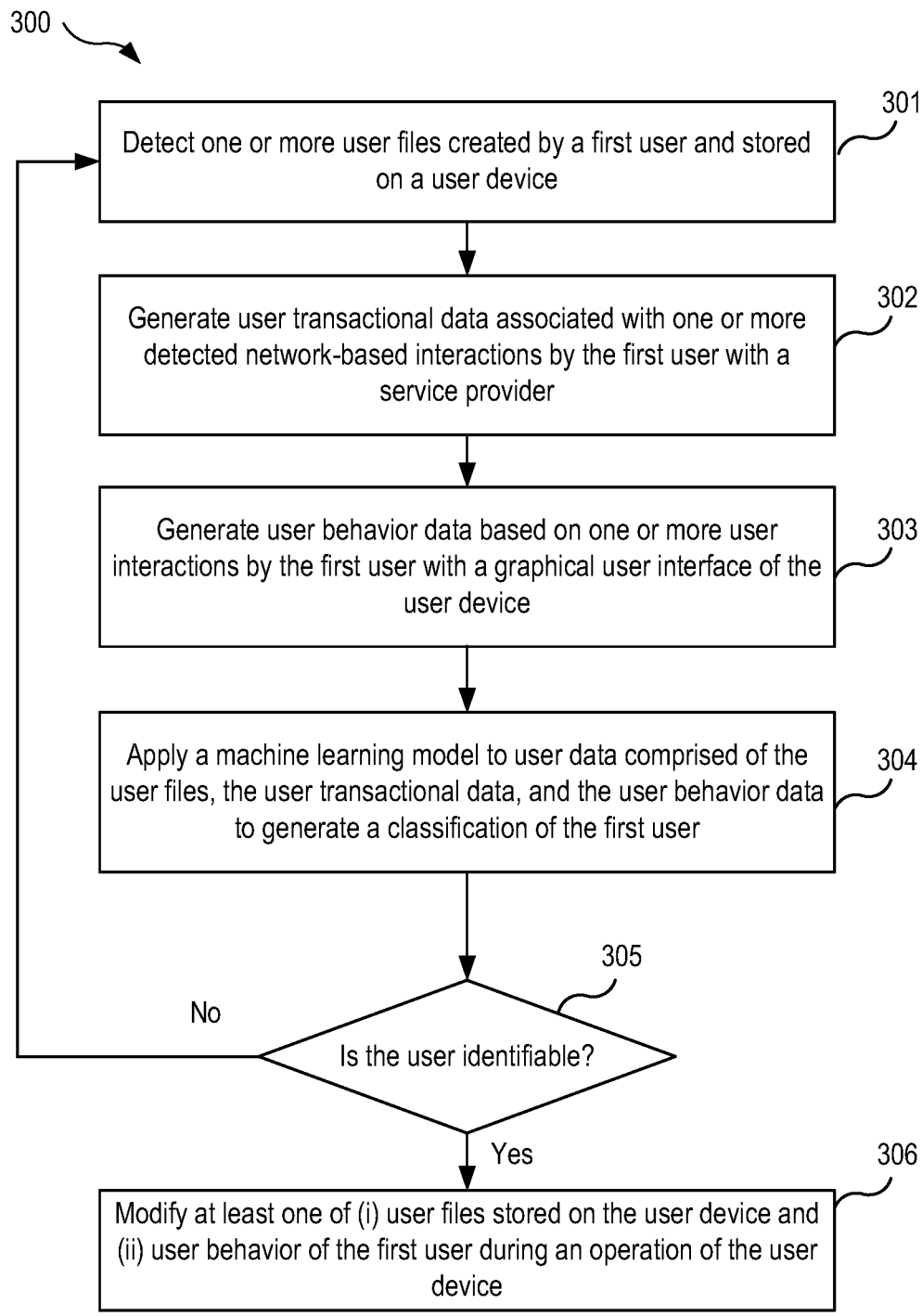
FIG. 3 is a flowchart illustrating a method for protecting user data in accordance with aspects of the present disclosure.

FIG. 3 is a flowchart illustrating a method 300 for protecting user data in accordance with exemplary aspects of the present disclosure. It is noted that the following description of the exemplary method makes reference to the system and components described above.

The method 300 begins at step 301. In step 301, the data privacy manager 202 detects one or more user files created by a first user and stored on a user device. The data privacy manager 202 may scan the one or more user files and determine that the files contain personal information associated with the first user. In some aspects, the data privacy manager 202 may receive, from a public monitor 212, an indication that personal information associated with the first user is publicly available on a social networking service or other third-party service 230. It is noted that the data privacy manager 202 is a device comprising a hardware processor.

In step 302, the data privacy manager 202 generates user transactional data associated with one or more detected network-based interactions, by the first user, with a service provider.

In step 303, the data privacy manager 202 generates user behavior data based on one or more user interactions, by the first user, with a graphical user interface of the user device.

In step 304, the data privacy manager 202 applies a machine learning model to user data to generate a classification of the first user, wherein the user data comprises the user files, the user transactional data, and the user behavior data. In those aspects in which the data privacy manager 202 receives indication from a public monitor 212, the received indication may be incorporated into the user data to which the machine learning model is applied. In some aspects, the machine learning model has been trained based on the collected user data to simulate advertising behavioral targeting the first user.

In step 305, the data privacy manager 202 determines whether the user is identifiable based on the classification. When the user is identifiable, the method proceeds to step 306. Otherwise, the method disregards the user activities and/or files if the classification does not indicate that the user activities and/or files are identifiable as the user and proceeds to step 301.

In step 306, the data privacy manager 202 modifies at least one of (i) user files stored on the user device and (ii) user behavior of the first user during an operation of the user device.

In some aspects, the data privacy manager 202 may modify at least one of the detected one or more user files based on a determination that the first user is transmitting the at least one of the detected one or more user files to an external resource. In some aspects, the data privacy manager 202 may modify the behavior of the user 101 by inserting random user input events associated with an input device of the user device. In one aspect, such user input events may include input events for at least one of mouse cursor movement and keyboard shortcuts. In one aspect, the data privacy manager 202 may modify a graphical user interface setting associated with a windowed graphical user interface of the user device.

Figure 4:
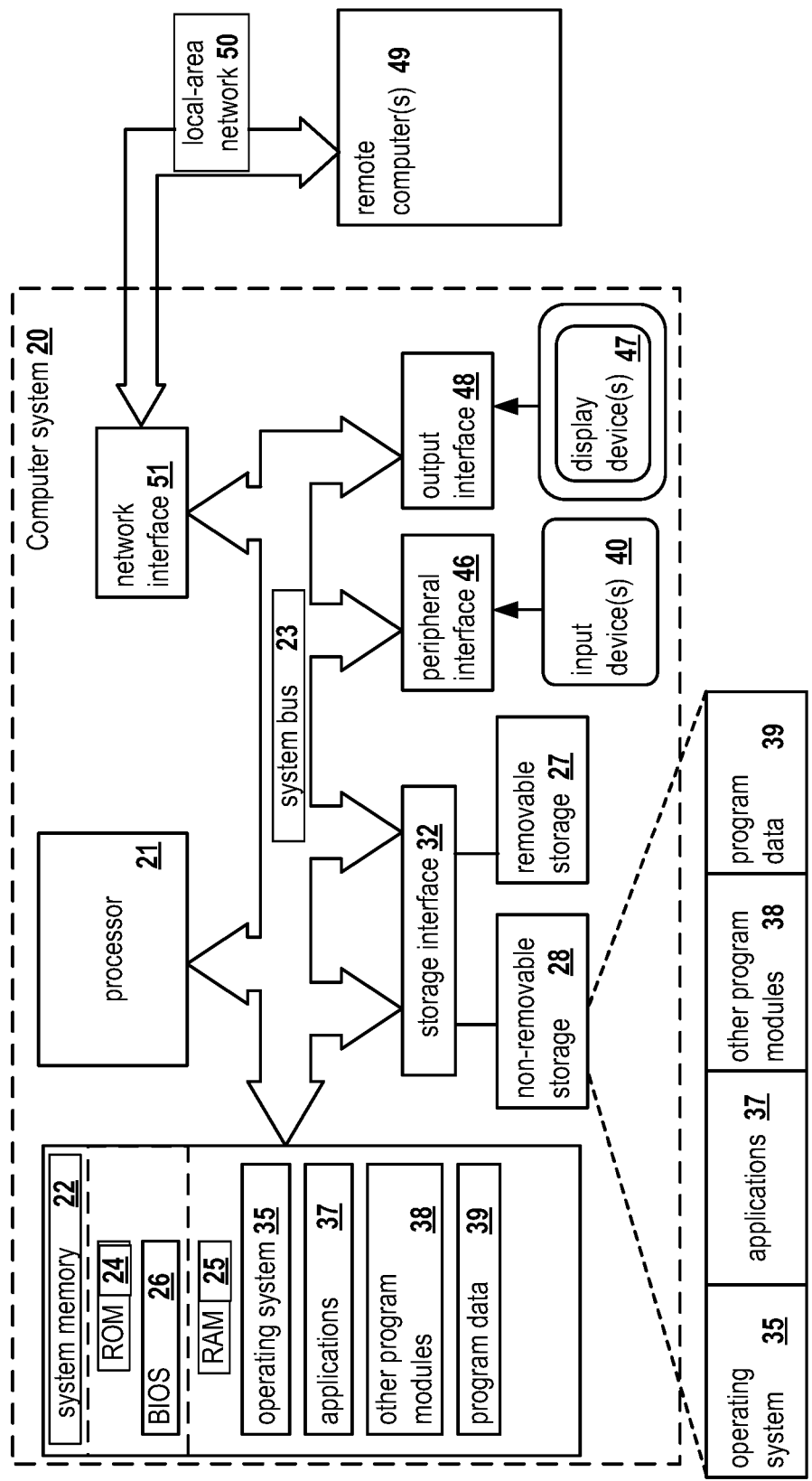
FIG. 4 presents an example of a general-purpose computer system on which aspects of the present disclosure can be implemented.

FIG. 4 presents an example of a general-purpose computer system 20 on which aspects of the present disclosure can be implemented. It should be noted that the computer system 20 can correspond to the data privacy manager 202, for example, as described above. It should be noted that the computer system 20 can also correspond to a virtual machine on a computing device, for example, as described earlier the intercepting module may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM;

flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for masking user identity, comprising:
   detecting one or more user files modified by a user on a user device;
   identifying user actions executed by the user to modify the one or more user files;
   training a machine learning algorithm to identify whether an arbitrary user action is performed by the user, wherein the user actions used by the user to modify the one or more user files are comprised in a training dataset of the machine learning algorithm;
   detecting a user action to modify a user file;
   determining, using the machine learning algorithm, whether the user action classifies as being performed by the user; and
   in response to determining that the machine learning algorithm classifies the user action as being performed by the user, modifying the user action to mask an identity of the user.

2. The method of claim 1, further comprising:
   identifying user transactional data associated with one or more detected network-based interactions with a service provider by the user, wherein the training dataset further comprises the user transactional data.

3. The method of claim 1, further comprising:
   identifying user behavior data based on one or more user interactions with a graphical user interface of the user device by the user, wherein the training dataset further comprises the user behavior data.

4. The method of claim 1, wherein modifying the user action to mask the identity of the user comprises modifying the user action such that the modified user action is not classified by the machine learning algorithm as being performed by the user.

5. The method of claim 1, wherein detecting the one or more user files modified by the user is performed using a web crawler and/or search bot.

6. The method of claim 1, wherein the machine learning algorithm is trained to simulate an advertising behavior targeting the user.

7. The method of claim 1, further comprising:
   determining, based on the machine learning algorithm, a likelihood that user behavior data of the user is uniquely identifiable by a third party; and
   modifying the user action of the user to anonymize an operation of the user device based on the determined likelihood.

8. The method of claim 7, wherein modifying the user action further comprises:
   inserting random user input events associated with an input device of the user device, wherein the user input events include at least one of: mouse cursor movements and keyboard shortcuts.

9. The method of claim 7, wherein modifying the user action further comprises:
   modifying graphical user interface settings associated with a windowed graphical user interface of the user device.

10. A system for masking user identity, comprising:
    a hardware processor configured to:
    detect one or more user files modified by a user on a user device;
    identify user actions executed by the user to modify the one or more user files;
    train a machine learning algorithm to identify whether an arbitrary user action is performed by the user, wherein the user actions used by the user to modify the one or more user files are comprised in a training dataset of the machine learning algorithm;
    detect a user action to modify a user file;
    determine, using the machine learning algorithm, whether the user action classifies as being performed by the user; and
    in response to determining that the machine learning algorithm classifies the user action as being performed by the user, modify the user action to mask an identity of the user.

11. The system of claim 10, wherein the hardware processor is further configured to:
    identify user transactional data associated with one or more detected network-based interactions with a service provider by the user, wherein the training dataset further comprises the user transactional data.

12. The system of claim 10, wherein the hardware processor is further configured to:
    identify user behavior data based on one or more user interactions with a graphical user interface of the user device by the user, wherein the training dataset further comprises the user behavior data.

13. The system of claim 10, wherein the hardware processor is further configured to modify the user action to mask the identity of the user such that the modified user action is not classified by the machine learning algorithm as being performed by the user.

14. The system of claim 10, wherein the hardware processor is further configured to detect the one or more user files modified by the user is performed using a web crawler and/or search bot.

15. The system of claim 10, wherein the machine learning algorithm is trained to simulate an advertising behavior targeting the user.

16. The system of claim 10, wherein the hardware processor is further configured to:
    determine, based on the machine learning algorithm, a likelihood that user behavior data of the user is uniquely identifiable by a third party; and
    modify the user action of the user to anonymize an operation of the user device based on the determined likelihood.

17. The system of claim 16, wherein the hardware processor is further configured to modify the user action by:
    inserting random user input events associated with an input device of the user device, wherein the user input events include at least one of: mouse cursor movements and keyboard shortcuts.

18. The system of claim 16, wherein the hardware processor is further configured to modify the user action by:
    modifying graphical user interface settings associated with a windowed graphical user interface of the user device.

19. A non-transitory computer readable medium storing thereon computer executable instructions for masking user identity, including instructions for:
    detecting one or more user files modified by a user on a user device;
    identifying user actions executed by the user to modify the one or more user files;

training a machine learning algorithm to identify whether an arbitrary user action is performed by the user, wherein the user actions used by the user to modify the one or more user files are comprised in a training dataset of the machine learning algorithm;

detecting a user action to modify a user file;

determining, using the machine learning algorithm, whether the user action classifies as being performed by the user; and in response to determining that the machine learning algorithm classifies the user action as being performed by the user, modifying the user action to mask an identity of the user.

* * * * *